UNITED STATES PATENT OFFICE.

OSCAR FRED HEDENBURG, OF PITTSBURGH, PENNSYLVANIA, ASSIGNOR TO FRANK O. MOBURG, OF TOLEDO, OHIO.

DRY LIME AND SULFUR PRODUCT AND METHOD OF MAKING THE SAME.

1,336,957.    Specification of Letters Patent.    Patented Apr. 13, 1920.

No Drawing.    Application filed November 20, 1918. Serial No. 263,355.

*To all whom it may concern:*

Be it known that I, OSCAR F. HEDENBURG, residing at Pittsburgh, in the county of Allegheny, State of Pennsylvania, have invented certain new and useful Improvements in Dry Lime and Sulfur Products and Methods of Making the Same; and I do hereby declare the following to be a full, clear, and exact description of the invention, such as will enable others skilled in the art to which it appertains to make and use the same.

My invention relates to lime and sulfur products, such for example as the compounds of lime and sulfur commonly employed as germicides, insecticides and the like. The main objects of the invention are to provide a new and improved dry product of lime and sulfur and method of making the same. Other objects of the invention will be brought out in the course of the following description.

It is well understood in the art that the products commercially known as "lime and sulfur" are mainly chemical compounds of calcium and sulfur, principally polysulfids of calcium, and it is to the production of such products in dry form that the present invention particularly relates.

Solutions of lime and sulfur for use particularly as germicides, insecticides and the like are well known. Such solutions are generally prepared by heating to boiling a mixture of water, water slaked lime and sulfur; one part of lime to 2, or 2.25, parts of sulfur being used, with sufficient water to obtain a solution of the desired specific gravity, or Baumé. The reaction is usually represented as follows:

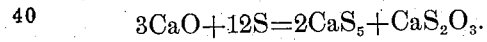

According to this equation, there is formed calcium pentasulfid and calcium thiosulfate. At the boiling temperature, however, calcium thiosulfate decomposes partially to give calcium sulfite and sulfur,

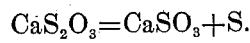

Accordingly, in practice, less sulfur is generally used than is represented by the first equation. The correct amount of sulfur is usually found by trial. In the manufacture of lime and sulfur solutions, a sludge, or sediment, is obtained, which consists mainly of calcium sulfite.

The commercial solution offered for sale is about 33 Baumé, or 1.2946 specific gravity. This solution contains mainly calcium pentasulfid and calcium thiosulfate. A certain amount of calcium tetrasulfid is also probably present in the solution, but the polysulfids are generally calculated as pentasulfid. It is upon the polysulfid content that the insecticidal value of the solution depends. More concentrated solutions, 38–40 Baumé (1.3551–1.381 specific gravity) can be made, but such solutions are liable to deposit crystals on standing whereby the solution itself becomes lower in gravity, or Baumé.

A dry lime and sulfur product is very desirable, because such dry product can be handled more easily than the solution. In order to obtain the dry lime and sulfur product, solutions thereof have heretofore been distilled *in vacuo* to remove substantially all of the water. As heretofore practised, the distillation is carried on until a dry product remains in the still, and where the operation is carried out in a glass still, the still is broken to remove the product. The final product thus obtained is a dry powdered amorphous substance of light yellow color containing a relatively high percentage, usually about 15%, of insoluble matter, which settles very slowly during any subsequent attempt to dissolve the product. This relatively high percentage of insoluble matter in the dry product is, of course, objectionable.

I have discovered that when a lime and sulfur solution is greatly concentrated by distillation in a good vacuum, say, for example, about 29 inches of mercury, at a temperature of from about 55° C. to about 80° C. a liquid product is obtained which can be readily poured while hot, and which will harden on cooling so as to form a substantially physically dry lime and sulfur product. A physically dry lime and sulfur product can thus be obtained by removing sufficient water from a lime and sulfur solution by distillation *in vacuo* and pouring the resulting concentrated liquid while hot into suitable molds to harden upon cooling. I have found that the distillation should be carried on until not more than about 40% of water remains in the concentrated liquid, since the presence of a greater percentage of water will prevent hardening of the product upon cooling, and I have also found that at least about 20% of water should be left in the liquid in order to maintain sufficient fluidity for satisfactory pouring.

A product containing about 35% of water has been found to be the most satisfactory, since it contains the least amount of insoluble matter. In this connection I have found that when the distillation is carried on until less than about 35% of water is left in the concentrated liquid, hydrogen sulfid is evolved rapidly and the loss of this substance seems to account for the increase in insoluble matter contained in the hardened product.

When the distillation has been carried on until the concentrated liquid contains about 35% of water, I have found that the dry and hardened product obtained by cooling contains generally less than about 5% of insoluble matter, whereas if the distillation is carried through until the concentrated liquid contains between 30 to 20% of water, the insoluble matter in the dry and hardened product will be greater than about 12%, and increases as the distillation is pushed to reduce the water content of the concentrated liquid.

For this reason the water content of the product is preferably made about 35%, since such a product will pour readily when hot and easily hardens upon cooling and contains a relatively small amount of insoluble matter.

In carrying out the method of the invention, I concentrate a suitable solution of lime and sulfur, obtained, for example, as described in the fore part of this specification, by evaporation or distillation in a good vacuum at a temperature of between 55° C. and 80° C. As previously stated, I have found a vacuum of about 29 inches of mercury to be suitable for carrying out the process. The concentration of the solution is continued until the desired amount of water has been removed and the concentrated liquid is then poured while hot into suitable molds, and will upon cooling become hard and crystalline in structure. The hardened product is sufficiently dry for all commercial purposes and may be broken up or reduced to such form as is most convenient for use.

While I prefer to carry on the evaporation or distillation until a concentrated solution of lime and sulfur containing about 35% of water is obtained, it will, of course, be understood that I do not wish to be limited to this particular percentage of water content; and in general the concentration is carried on until sufficient water is removed from the solution so that the resulting mass will solidify or crystallize upon cooling, and so that the amount of mechanically held water is not sufficient to drain away from the solid mass in any substantial amount.

I have found it advantageous to start the distillation at about 55° C. and to gradually raise the temperature to about 80° C., but it will, of course, be understood that the distillation can be started at a lower temperature and finished at a higher temperature.

While I have hereinbefore particularly referred to the concentration of the solution of lime and sulfur in vacuo, it is not necessary that the evaporation or distillation be carried out under such conditions. Thus, I have found that the lime and sulfur solution may be concentrated at atmospheric pressure, and that the resulting product, obtained in accordance with the principles of the invention, solidifies and gives substantially a similar product to that made by vacuum distillation.

Instead of casting the product, by pouring the concentrated liquid into molds, the improved dry product of the present invention may be solidified or hardened in a granular form. The general procedure is the same up to the point of pouring the concentrated liquid. Where a granular product is desired, the liquid mass is stirred while cooling, thus producing a granulated lime and sulfur product which is a mixture of crystals and contains about the same percentage of insoluble matter as the molded product.

I claim:

1. The method of producing a dry lime and sulfur product which consists in distilling a solution of lime and sulfur until the resulting concentrated product will pour while hot and harden upon cooling, and solidifying such resulting concentrated product by cooling the same.

2. The method of producing a dry lime and sulfur product which consists in concentrating a solution of lime and sulfur until the percentage of water remaining therein is between 20 and 40, and solidifying the resulting concentrated liquid by cooling the same.

3. The method of producing a dry lime and sulfur product, which consists in distilling a solution of lime and sulfur in a vacuum of about 29 inches of mercury, and thereby reducing the water content thereof to between 20 and 40%, and hardening the resulting concentrated solution by cooling the same.

4. The method of producing a dry lime and sulfur product, which consists in concentrating a solution of lime and sulfur until the water content thereof is about 35%, and hardening the resulting concentrated solution by cooling the same.

5. The method of producing a dry lime and sulfur product, which consists in distilling a solution of lime and sulfur in a good vacuum and at a temperature ranging from about 55° C. to about 80° C., and thereby reducing the water content of the solution to between 20 and 40%, and hardening the resulting concentrated solution by cooling the same.

6. The method of producing a dry lime and sulfur product, which consists in concentrating a solution of lime and sulfur in a good vacuum and at a temperature ranging from about 55° C. to about 80° C., and thereby removing from the solution a sufficient amount of water so that the resulting concentrated solution will pour while hot and harden upon cooling, and hardening such resulting concentrated solution by cooling the same.

7. A new article of manufacture comprising a dry lime and sulfur product composed principally of a polysulfid or polysulfids of calcium and containing between 20% and 40% of water.

8. A new article of manufacture comprising a dry lime and sulfur product composed principally of a polysulfid or polysulfids of calcium and containing about 35% of water.

9. A new article of manufacture comprising a dry lime and sulfur product composed principally of a polysulfid or poysulfids of calcium and containing less than about 12% of insoluble matter.

10. A new article of manufacture comprising a dry lime and sulfur product containing about 35% of water, and less than about 5% of insoluble matter.

11. A new article of manufacture comprising a dry crystalline composition of lime and sulfur containing between 20% and 40% of water.

12. A new article of manufacture comprising a dry crystalline polysulfid or polysulfids of calcium containing between 20% and 40% of water.

13. A new article of manufacture comprising a dry crystalline polysulfid or polysulfids of calcium containing about 35% of water and less than about 5% of insoluble matter.

In testimony whereof I affix my signature.

OSCAR FRED HEDENBURG.